United States Patent
Williams

(10) Patent No.: US 8,002,510 B2
(45) Date of Patent: Aug. 23, 2011

(54) PANEL DOLLY APPARATUS

(76) Inventor: David L. Williams, Pembroke Pines, FL (US)

( * ) Notice: Subject to any disclaimer, the term of this patent is extended or adjusted under 35 U.S.C. 154(b) by 625 days.

(21) Appl. No.: 12/000,463

(22) Filed: Dec. 12, 2007

(65) Prior Publication Data

US 2008/0093811 A1    Apr. 24, 2008

Related U.S. Application Data

(63) Continuation-in-part of application No. 11/183,765, filed on Jul. 19, 2005, now abandoned.

(51) Int. Cl.
*E04G 21/14* (2006.01)

(52) U.S. Cl. .............. 414/10; 414/490; 24/494

(58) Field of Classification Search ............ 269/905, 269/228; 280/35; 414/10, 490, 11, 12; 24/494, 24/486, 596
See application file for complete search history.

(56) References Cited

U.S. PATENT DOCUMENTS

| | | | |
|---|---|---|---|
| 2,503,388 A | 4/1950 | Hedlund | |
| 3,861,662 A | 1/1975 | Morse | |
| 4,050,671 A | 9/1977 | Coleman | |
| 4,138,099 A * | 2/1979 | Englehart | 269/17 |
| 4,141,192 A | 2/1979 | Augustine | |
| 4,278,244 A | 7/1981 | Carter | |
| 4,746,141 A | 5/1988 | Willis | |
| 4,978,132 A | 12/1990 | Wilson et al. | |
| 5,048,806 A | 9/1991 | Deutsch et al. | |
| 5,244,221 A * | 9/1993 | Ward | 280/79.7 |
| 5,288,090 A | 2/1994 | Bross | |
| 5,599,031 A * | 2/1997 | Hodges | 280/79.11 |
| 5,660,637 A * | 8/1997 | Dodge | 118/500 |
| 5,779,252 A * | 7/1998 | Bolton, Jr. | 280/47.371 |
| 6,036,219 A * | 3/2000 | Oefelein et al. | 280/638 |
| 6,231,034 B1 | 5/2001 | Walker et al. | |
| 6,264,184 B1 * | 7/2001 | Armstrong et al. | 269/17 |
| 6,338,758 B1 | 1/2002 | Curran | |
| 6,443,441 B1 * | 9/2002 | Buitenhuis | 269/41 |
| 6,481,937 B1 * | 11/2002 | Sommerfeld et al. | 408/115 R |
| 6,505,844 B2 | 1/2003 | Hallman et al. | |
| 6,595,507 B2 * | 7/2003 | Dykstra | 269/228 |
| 6,773,218 B1 * | 8/2004 | Mingoes | 414/10 |
| 2003/0002957 A1 * | 1/2003 | Etheredge | 414/11 |
| 2003/0204961 A1 | 11/2003 | Sumner | |
| 2007/0018417 A1 * | 1/2007 | Ponce | 280/79.7 |

* cited by examiner

*Primary Examiner* — Joshua I Rudawitz
(74) *Attorney, Agent, or Firm* — William M. Hobby, III

(57) ABSTRACT

A door and panel dolly apparatus has a frame having a telescoping center frame member with a perpendicular wheel frame member on one end and a perpendicular panel support frame member on the other end. Both the wheeled frame member and the floor support frame member have a pair of generally perpendicular panel support post extending therefrom and a swinging door clamp attached thereto. Each swinging panel clamp is positioned to swing from an open position to a closed clamping position for clamping a panel between two clamps or against a perpendicular clamp post. The pair of swinging panel clamps are each attached to a clamp post and have a rod with a clamping surface on one end thereof for threadedly adjusting each of the swinging clamps to clamp a panel of different widths. Each swinging panel clamp is a toggling clamp mechanism.

7 Claims, 6 Drawing Sheets

PANEL DOLLY APPARATUS

This patent application is a continuation-in-part of my U.S. patent application Ser. No. 11/183,765, filed Jul. 19, 2005 now abandoned for a DOOR DOLLY APPARATUS.

BACKGROUND OF THE INVENTION

The present invention relates to a panel dolly and especially to a panel or door dolly and door mounting tool having swinging panel clamps for rapidly attaching and removing a panel to and from the dolly.

Door support devices have been in use for years for assisting individuals in the installation of doors within door jambs and these devices are frequently in the form of a door dolly which allows the door to be attached thereto and wheeled into position for mounting the door. Carpenters typically have to move doors into position in new construction and have to fit and hang the doors to door openings in buildings. This sometimes requires hanging a door in an existing jamb when only the door needs replacing and at other times requires the installation of a new door jamb and door. The door has to be moved into position and then mounted to the door jamb and this is accomplished by positioning the door in the door opening and then using small wooden door shims and pry bars to raise and position the door to a position for mounting the door. The door must then be mounted to the jamb, again using door shims and pry bars to position the door in the exact position for attaching the hinges.

To accomplish these results, a variety of door dollys and door mounting jigs have been provided in the past. These may be seen in some of the following U.S. patents.

In the Morse U.S. Pat. No. 3,861,662 a combined door carrier and hanging device supports a door panel vertically with the hinged edge of the door in a horizontal position to permit a person to prepare the door for hanging. This door carrier has a frame with a pair of support members having adjustable clamp members mounted on each end of the frame. The carrier has a pair of wheels on one end and a pair of support legs on the other end. Another door mounting apparatus may be seen in U.S. Pat. No. 6,231,034 to Walker et al. which is a door mounting tool for mounting a door to a door jamb and includes a wheeled frame for supporting the door and rolling the door into position adjacent a door jamb.

In the Deutsch et al. U.S. Pat. No. 5,048,806, a door hanging aid uses a collapsible frame for supporting a door prior to the door being mounted on hinges and frames. In the Carter U.S. Pat. No. 4,278,244, a pivotable dolly for holding and transporting a door holds a rectangular door by one edge to permit the transportation, preparation and final attachment of the door to the jamb. The dolly includes clamps fixed to an elongated frame member to releasably hold the door by its edge and has a wheeled end for moving the door on the door dolly. The Hallman et al. U.S. Pat. No. 6,505,844 has a door transporting and support system having a wheeled frame for supporting a door. The Willis U.S. Pat. No. 4,746,141 is a door carrier having a wheeled frame in the nature of a hand cart for carrying a door standing on its edge. The Wilson et al. U.S. Pat. No. 4,978,132 is a pivotable hand truck for supporting and installing a door and has a pair of wheels secured to an L-shaped frame and allows the door to be pivoted between horizontal and vertical positions and lifted vertically to adjust to a selected height above a floor surface.

Other U.S. patents include the Augustine U.S. Pat. No. 4,141,192 for a door brace for facilitating hanging and the Bross U.S. Pat. No. 5,288,090 for a door dolly apparatus and the Curran U.S. Pat. No. 6,338,758 for a multiple object paint rack system for doors and shutters. The Coleman U.S. Pat. No. 4,050,671 is for a wheeled door hanger device and the Hedlund U.S. Pat. No. 2,503,388 is for a door hanger and trolley.

The present invention is for a panel dolly for transporting and hanging a door or transporting a panel which has a wheeled frame with an elongated center member telescopably adjustable for different size panels. The panel clamping mechanism has swinging clamps for rapidly clamping and unclamping a door or panel to the dolly and avoiding the time consuming practice of hand threading a clamp to a door when attaching or removing a door from a dolly.

SUMMARY OF THE INVENTION

A panel dolly apparatus has a frame having a telescoping center frame member with a perpendicular wheel frame member on one end and a perpendicular panel support frame member on the other end. Both the wheeled frame member and the floor support frame member have generally perpendicular panel support posts extending therefrom and swinging panel clamps attached to each post. Each swinging panel clamp is positioned to swing from an open position to a closed clamping position for clamping a panel between pairs of swinging panel clamps or against each perpendicular support post. Such pair of swinging panel clamps are attached to a clamp post and have a threaded rod with a clamping surface on one end thereof for threadedly adjusting each of the swinging clamps to clamp a panel of different widths. Each swinging panel clamp may have a toggling clamp mechanism.

BRIEF DESCRIPTION OF THE DRAWINGS

Other objects, features, and advantages of the present invention will be apparent from the written description and the drawings in which.

DESCRIPTION OF THE PREFERRED EMBODIMENTS

Figure 1:
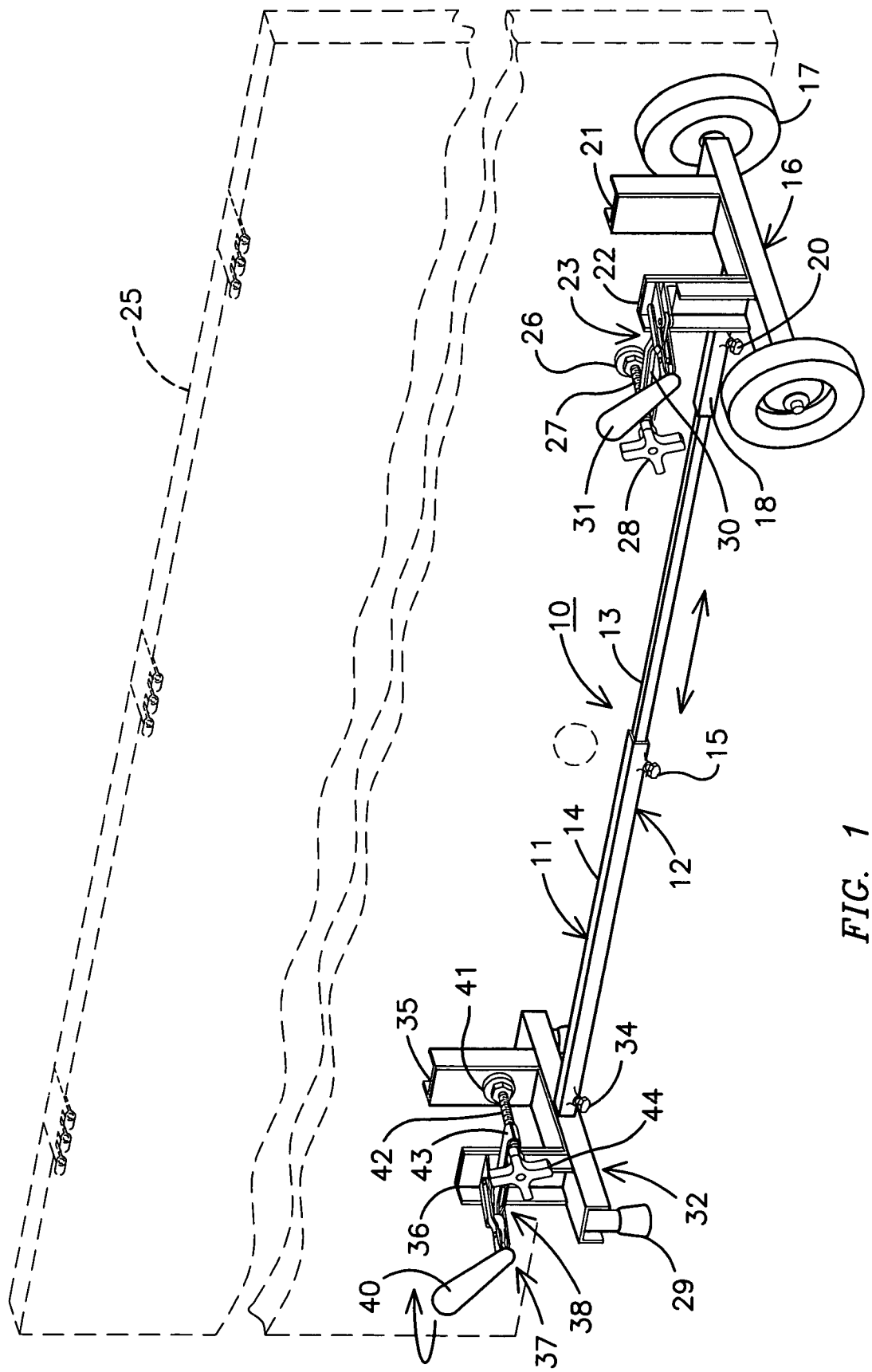
FIG. 1 is a perspective view of a door dolly in accordance with the present invention.

Referring to the drawings, FIGS. 1-4, a door dolly 10 has a frame 11 having a telescoping elongated center frame member 12 which has a square cross-section and has a telescoping frame member 13 telescoping into a fixed elongated frame member 14 and having a threaded locking nut 15. One end of the frame 11 has a wheeled frame member 16 running generally perpendicular to the telescoping frame member 12. The wheeled frame member 16 has a pair of wheels 17 rotatably attached thereto along with a center frame member attaching tube 18 having a threaded locking nut 20. The wheeled frame member has an upright door supporting post 21 and a swing clamp supporting post 22 having a swinging door clamp 23 swingably attached thereto. Swinging clamp 23 has a toggle mechanism 24 to allow the swinging clamp to toggle and lock against a door 25 positioned in the door dolly 10 with one side against the door support post 21. The swinging clamp has a door clamping surface 26 attached to the end of a threaded rod 27 having a handle 28 on one end and threadedly attached to a swinging clamp member 30. A handle 31 is attached to the swinging clamp 23 for swinging the clamp from an open to a closed position. A floor support frame portion 32 has a cross frame member 33 running generally perpendicular to the telescoping center frame member 12 and has a pair of legs 29 protruding therefrom. A rod is attached to the frame member 32 for attaching to the telescoping frame member 14 and slides over and is locked thereto with a locking nut 34. The floor support frame member 32 has a generally perpendicular door support post 35 extending therefrom and a generally perpendicular swinging clamp post 36 extending therefrom parallel to the door support post 35. A swinging clamp 37, identical to the swinging clamp 23, has a swinging toggle mechanism 38 and is attached to the swinging clamp support post 36. A handle 40 allows the swinging clamp to be swung into place against a door while a clamping surface 41 is on the end of a threaded rod 42 threaded through a clamp member 43. The handle 44 allows the threading of the threaded rod 42 to adjust the clamping surface 41.

Figure 2:
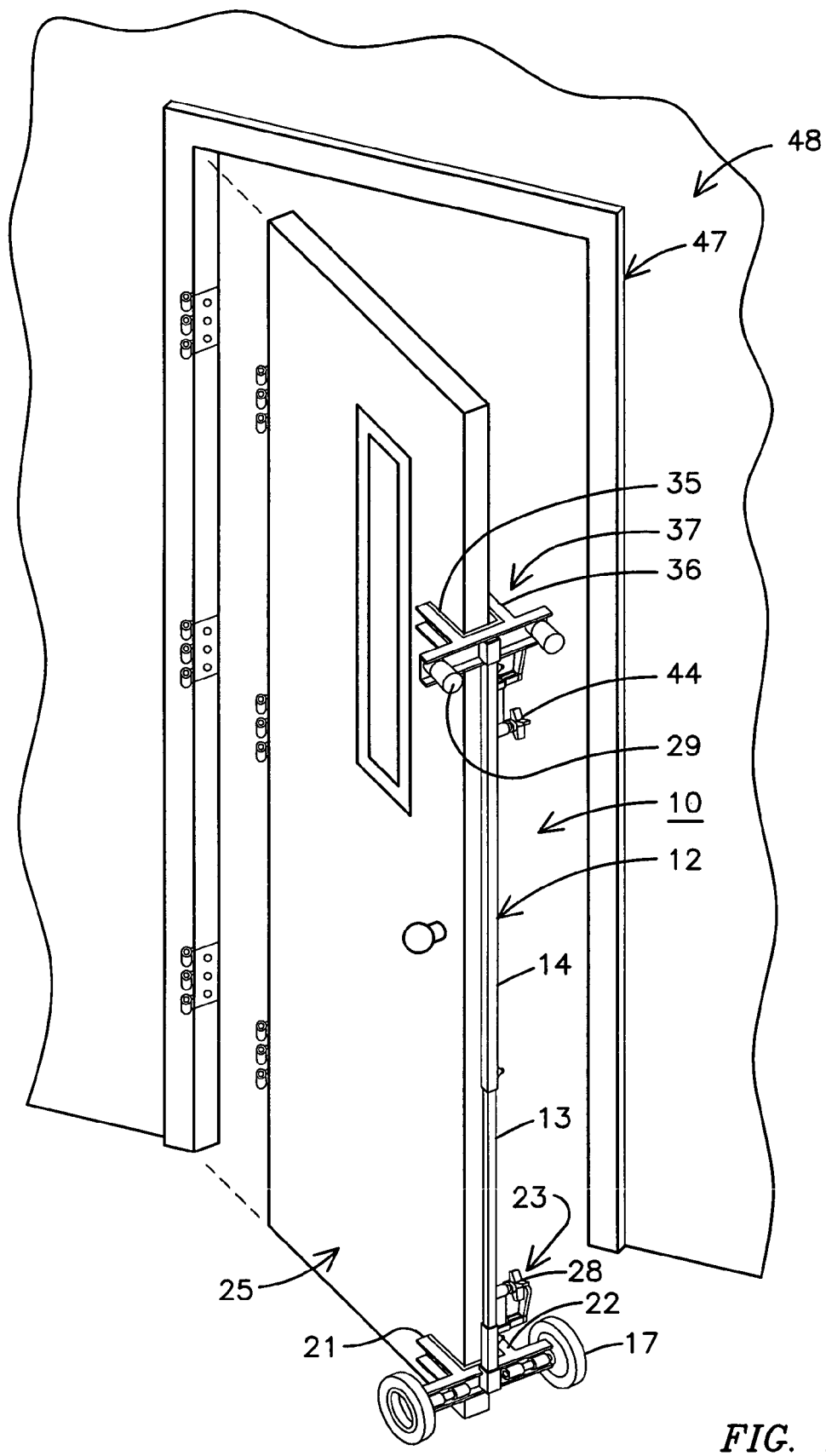
FIG. 2 is a perspective view of the door dolly having a door mounted thereto and positioned for hanging the door to a door jamb.
Figure 3:
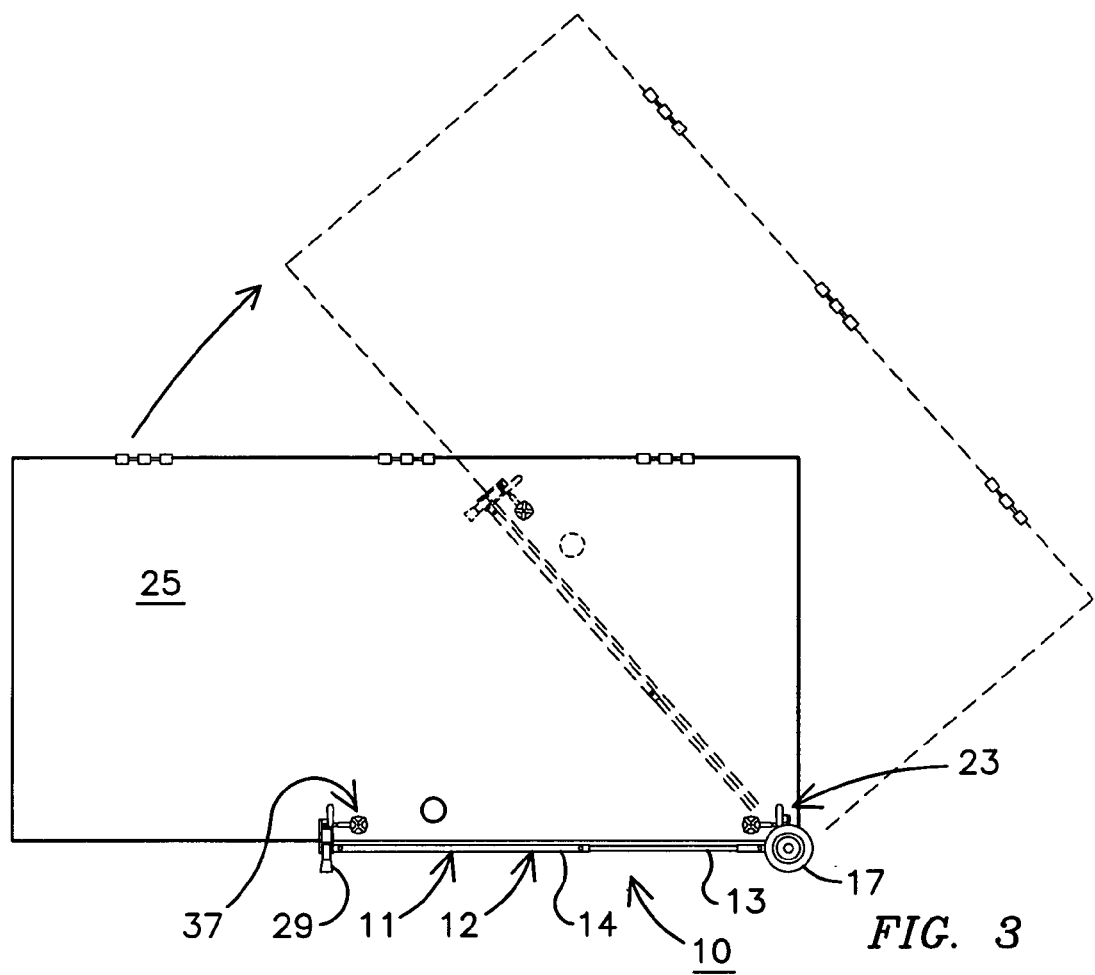
FIG. 3 is a side elevation of the door dolly of FIGS. 1 and 2 holding a door in a horizontal position.
Figure 4:
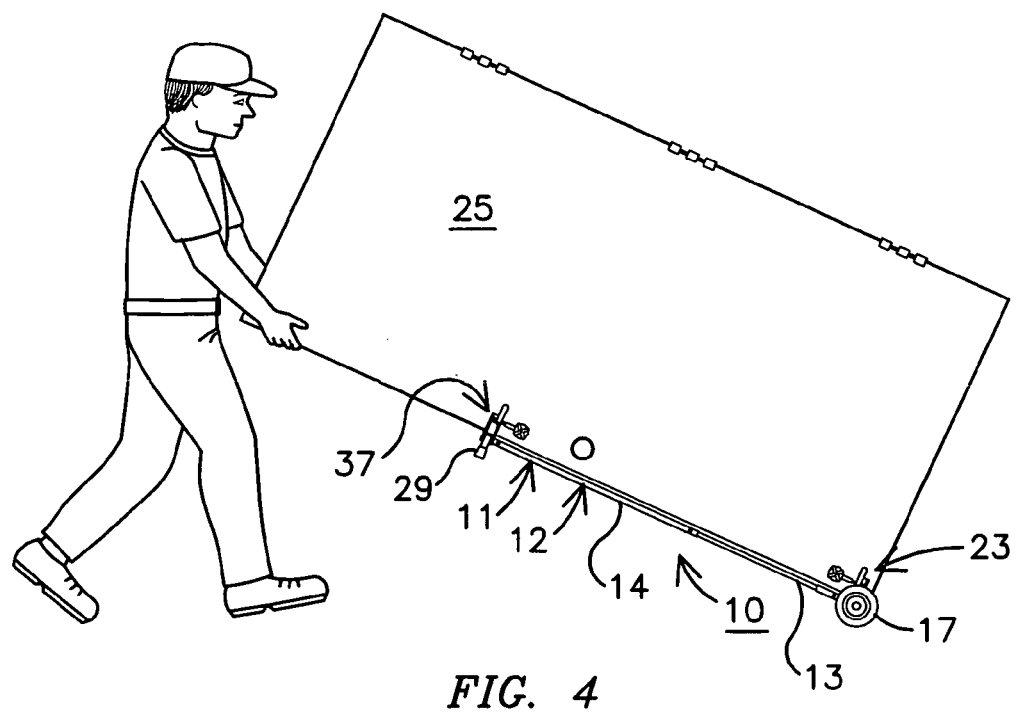
FIG. 4 is a side elevation of a door dolly in accordance with FIG. 3 having a door mounted therein and being wheeled to a mounting location.

In operation, a door 25 is placed on the frame members 16 and 32 and is positioned adjacent the door supporting post 21 and 35. The swinging clamps 23 and 37 are swung to a closed position to clamp the surfaces 26 and 41 against the door. This instantly clamps the door against the support post 21 and 35. A carpenter or other worker 46 may then lift the door attached to the door dolly 10 on the wheels 17, as shown in FIG. 4, to move the door in the nature of a hand cart to a position to be mounted in a jamb, as seen in FIG. 2. The door is tilted into a vertical or upright position, as shown in FIG. 2, and rolled on the wheels 17 to a position for mounting to a door jamb 47 in a building wall 48. The hinges can then be positioned and marked on the door jamb and the door 25 mounted to the jamb 47, at which time the swinging door clamps 23 and 37 can be rapidly swung into an open position releasing the door. The handles 31 and 40 are grasped to swing the clamps. However, it will be clear that the clamps must be positioned for a standard size door so that if a different width door is to be clamped to the door dolly 10, swinging clamps 23 and 37 can be rapidly adjusted for the different thickness of the door by rotating the handles 28 and 44 to threadedly move the clamping surfaces 26 and 41 for a door of a different thickness.

Figure 5:
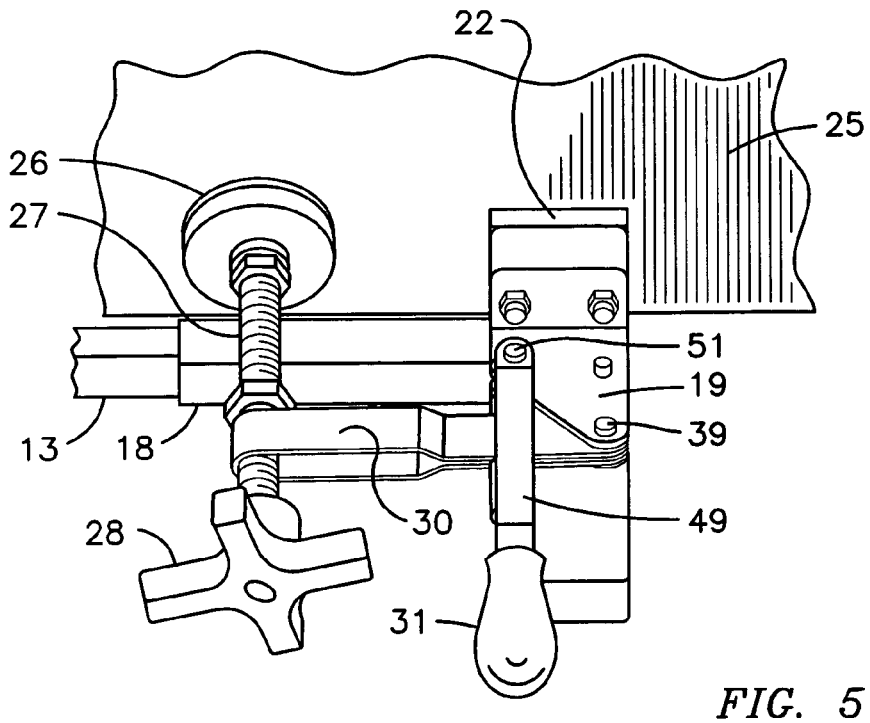
FIG. 5 is a cutaway perspective of the swinging door clamp clamped onto a door.
Figure 6:
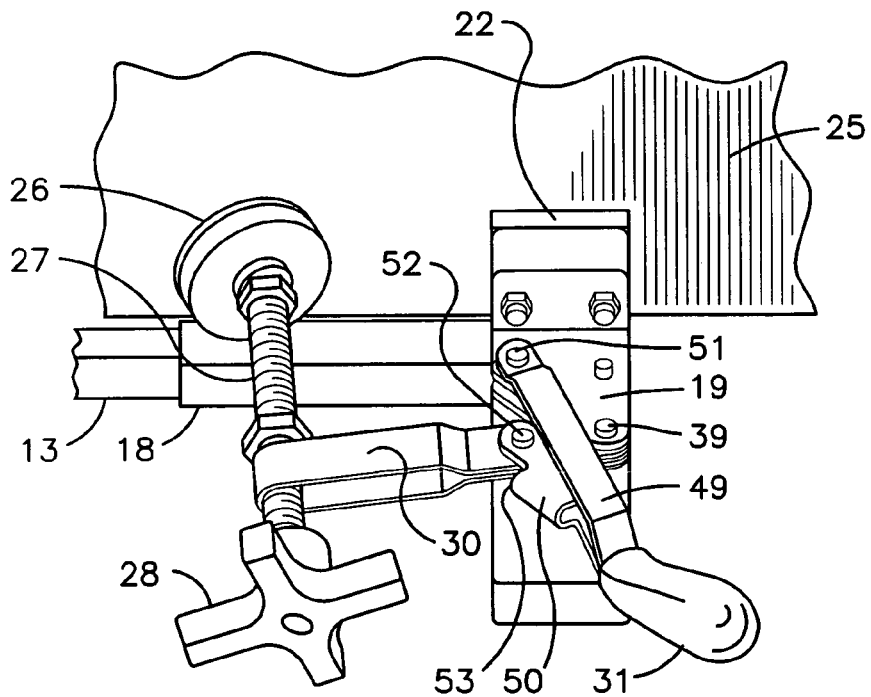
FIG. 6 is a cutaway perspective of the swinging door clamp in an unclamped position.

Referring to FIGS. 5 and 6, the swinging clamp 23 is more clearly illustrated with the clamp 23 closed onto a door 25 in FIG. 5 and released from the door 25 in FIG. 6. The clamp is adjusted for different size doors for rotating the handle 28 in the swinging clamp member 30 to adjust the position of the clamping surface 26 for different width of doors. The toggle mechanism 24 operates by swinging the handle 31 to swing the toggling bar 49 which swings on the hinge plate 19 hinge pin 51 to move the swinging clamp member 30 on the hinge pin 52. Swinging the toggle arm 49 on the hinge pin 50 rotates the toggle camming member 50 on the camming member hinge 52 to drive the camming member 50 surface 53 against the swinging clamp member 30 to rotate the swinging clamp member 30 on the hinge pin 39. This swings the clamp rod 27 and clamping surface 26 against or away from the door 25.

The camming surface 53 is shaped to lock the member 30 in a clamped position, as shown in FIG. 5, when the handle 31 is pulled to the position as shown in FIG. 5. This type of mechanism allows for the clamping and unclamping, to be accomplished with the handle 31 swinging the arm 49.

Figure 7:
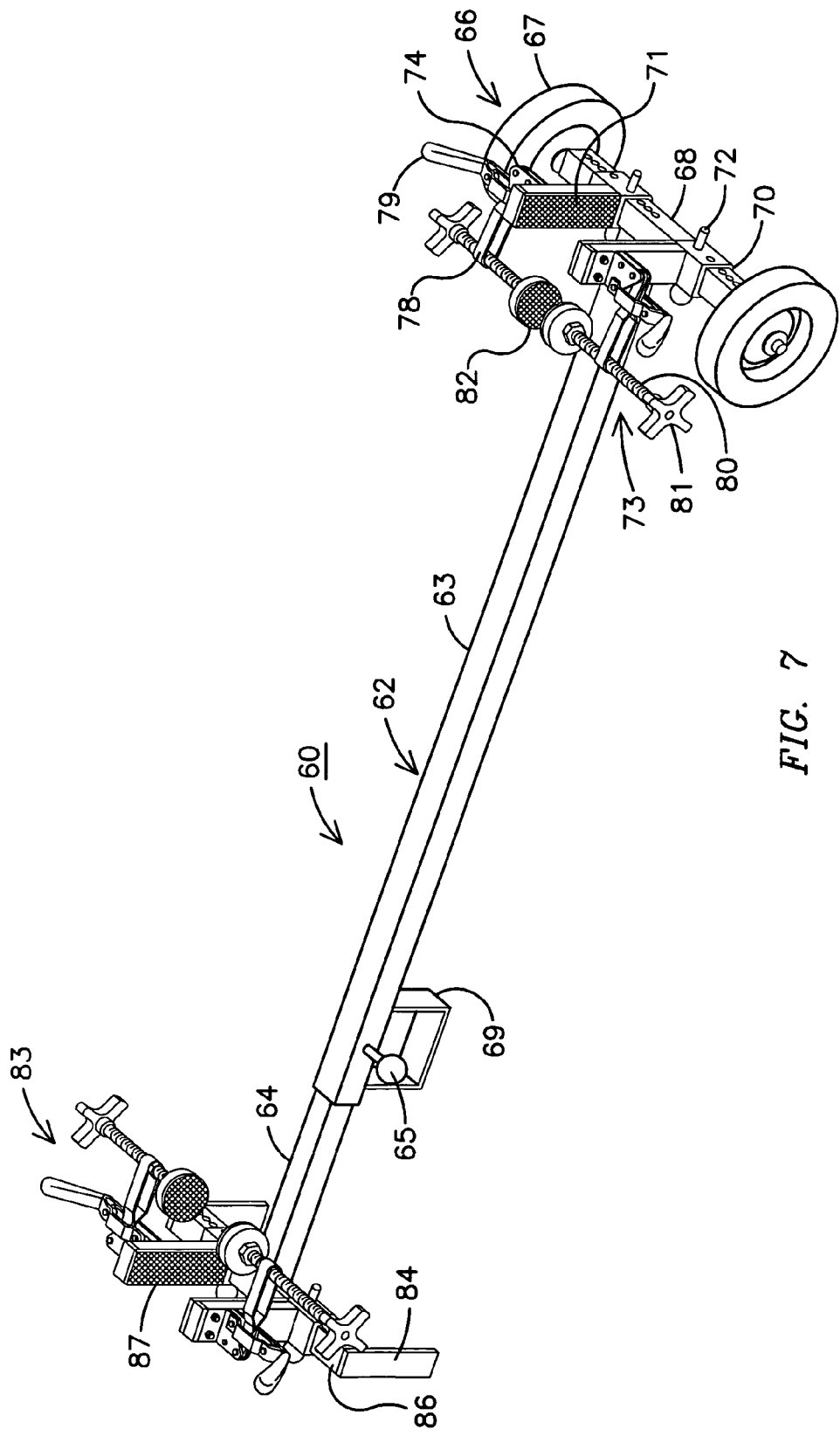
FIG. 7 is a perspective view of a panel dolly in accordance with the present invention.
Figure 8:
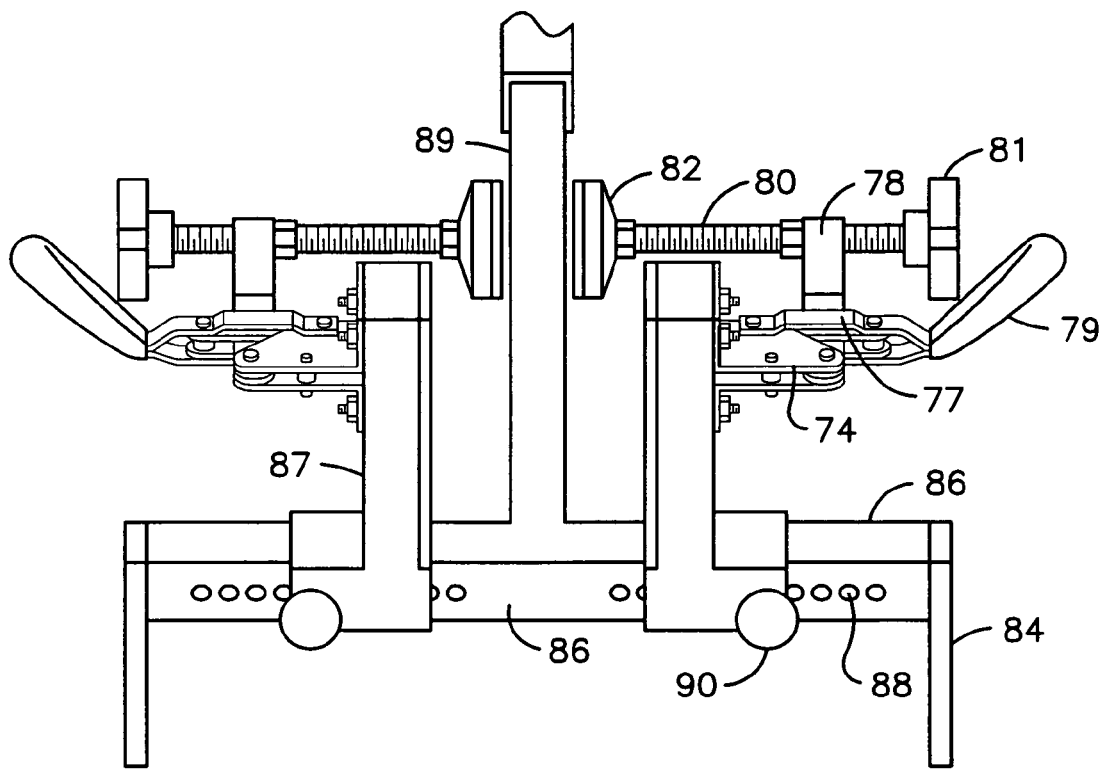
FIG. 8 is an end elevation of the panel dolly floor support frame having a pair of panel clamps.
Figure 9:
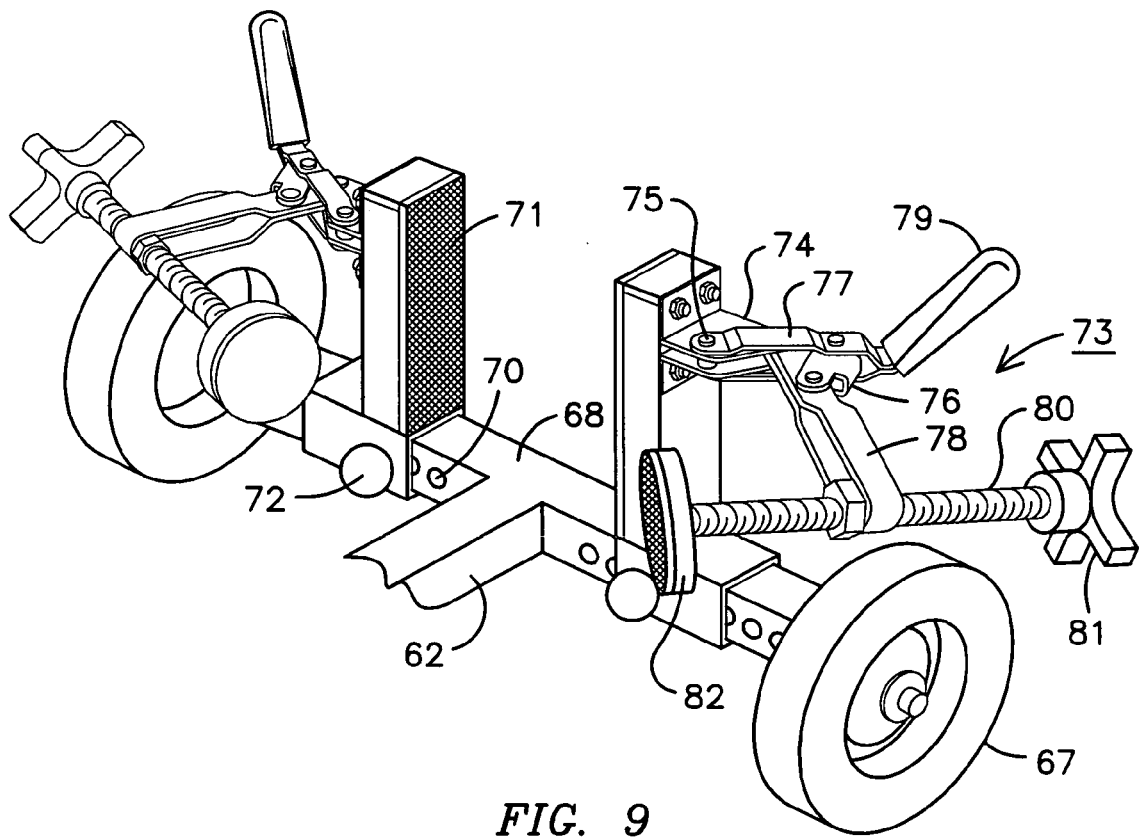
FIG. 9 is a partial perspective view of the wheeled frame member having open clamps.

Turning now to FIGS. 7-9, a panel dolly 60 is especially adapted for supporting and moving various types and size panels including doors and has a frame 61 which includes an elongated telescoping center frame member 62 having a telescoping frame member 63 which has a square cross section and a telescoping member 64. A locking pin 65 allows the telescoping member 62 to be locked in position at different lengths including telescoping to a storage position and extending the telescoping center frame member to an operative position for moving or supporting a panel. A foot brace 69 gives added support when the dolly is laying flat.

The elongated telescoping center frame member 62 has a wheeled frame portion 66 having a pair of wheels 67 attached to a supporting frame 68. The frame member 68 has a plurality of holes 70 therein and has a pair of wheeled frame members slidable clamp posts 71, each slidable on the frame member 68. A locking pin 72 on each clamp posts 71 allows each of the two clamp posts to be locked in position by sliding into the open holes, 70 of the wheeled frame 66. Each of the wheeled frame 66 clamp posts 71 has a swinging panel clamp 73 attached thereto. Each swinging panel clamp has a supporting frame 74 attached to the clamp post 71 has the swinging clamp end with a pin 75 which allows the swinging panel clamp 73 to swing thereon. Each swinging clamp includes a camming member 76 attached to the swinging toggle bar 77 having a handle 79 and a swinging clamp member 78 having a swinging clamp threaded bar 80 having a handle 81 on one end and a clamping surface 82 on the other end. The clamps on both sides of the wheeled frame are adjusted by rotating the handle 81 to position the clamping surfaces 82 for a particular panel then swinging both swinging panel clamps against the panel shown in FIG. 8.

As seen in FIG. 8, different type of panels can be clamped by the dual swinging clamps on either side of the panel dolly wheeled frame portion. The panel dolly 60 has a floor support frame 83 having a pair of panel support posts 84 extending from a frame support member 85 which is attached to the telescoping center frame member 64. The panel support frame 83 has a floor supporting frame member 86 having a pair of clamping posts 87 slidably mounted thereto. Frame member 86 has a plurality of openings 88 and has a pin 90 attached to the clamping post 87 for locking the clamping posts in different slidable positions. Each of the clamping posts has a swinging clamp 73 attached thereto which is the same as the swinging clamp on the wheeled frame 66. By having the clamp 73 attach to each clamping post 87 swingable from both sides of a panel allows a wide variety of panels to be attached to the panel dolly.

It should be clear at this time that a panel and door dolly have been provided which advantageously allows for the rapid adjustment of a telescoping center member for different panel sizes and allows for the rapid attachment of a panel to a panel or door dolly by swinging toggle clamps which are instantly locked in place.

However, the present invention is not to be construed as limited to the forms shown which are to be considered illustrative rather than restrictive.

I claim:
1. A panel dolly comprising:
   a frame having:

an elongated telescoping center frame member having a square cross-section, said elongated telescoping frame member telescoping between a storage position and a toting position, said elongated telescoping center frame having a wheeled frame member attached to one end thereof and having a generally perpendicular panel supporting post extending therefrom and having a pair of clamp post extending perpendicular therefrom and having a pair of wheels attached thereto, said elongated center frame member having a floor support frame member attached to the other end thereof and having a pair of generally perpendicular panel support posts extending from one side thereof and having a pair of clamp posts extending therefrom and said floor support frame member having a pair of floor support frame members extending from the other side thereof;

said wheeled frame member having a pair of swinging panel clamps positioned to swing from an open to a closed clamping position clamping a panel therebetween, one said panel clamp being attached to each side of said wheeled frame member panel support posts, each swinging panel clamp being positioned to swing from an open position to a clamping position clamping a panel between said pair of wheeled frame member panel clamps, each said wheeled frame member swinging panel clamp having a swinging clamp member having a threaded rod threaded therethrough and having a clamping surface on one end thereof whereby the threaded rod can be rotated to make threaded adjustments to each wheeled frame member swinging clamp;

said floor support frame member having a pair of swinging panel clamps positioned to swing from an open to a closed clamping position clamping a panel therebetween, one of said panel clamps being attached to each side of said floor support frame member panel support posts, each swinging panel clamp being positioned to swing from an open position to a clamping position clamping a panel between said pair of floor support frame member panel clamps, each said panel support frame member swinging door clamp having a swinging clamp member having a threaded rod threaded therethrough and having a clamping surface on one end thereof whereby the threaded rod can be rotated to make threaded adjustments to each wheeled frame member swinging clamp;

whereby a panel dolly can be telescoped from a storage position to a panel toting position and a panel can be quickly clamped thereto and unclamped therefrom for toting and positioning said panel.

2. The panel dolly in accordance with claim 1 in which each of said wheeled frame member panel clamp posts is slidably attached to said wheeled frame member.

3. The panel dolly in accordance with claim 2 in which each of said wheeled frame member panel clamp posts has a locking pin for locking said clamp post to said wheeled frame member in one of a plurality of positions.

4. The panel dolly in accordance with claim 3 in which each of said floor support frame member panel clamp posts is slidably attached to said floor support frame member.

5. The panel dolly in accordance with claim 4 in which each of said floor support frame member panel clamp post has a locking pin for locking said clamp post to said frame support member in one of a plurality of positions.

6. The panel dolly in accordance with claim 5 in which said elongated telescoping frame has a locking pin to lock said telescoping frame in one of a plurality of positions.

7. The panel dolly in accordance with claim 6 in which in which said elongated telescoping frame has a foot brace positioned between the ends thereof for supporting said telescoping frame between the ends thereof when in a rest position.

* * * * *